(12) United States Patent
Hsiung et al.

(10) Patent No.: US 8,193,599 B2
(45) Date of Patent: Jun. 5, 2012

(54) FABRICATING METHOD AND STRUCTURE OF A WAFER LEVEL MODULE

(75) Inventors: Hsin-Chang Hsiung, Tainan (TW); Chih-Wei Tan, Tainan (TW); Po-Lin Su, Tainan (TW)

(73) Assignee: Himax Semiconductor, Inc., Tainan (TW)

( * ) Notice: Subject to any disclaimer, the term of this patent is extended or adjusted under 35 U.S.C. 154(b) by 301 days.

(21) Appl. No.: 12/646,094

(22) Filed: Dec. 23, 2009

(65) Prior Publication Data

US 2011/0049547 A1    Mar. 3, 2011

Related U.S. Application Data

(60) Provisional application No. 61/239,184, filed on Sep. 2, 2009.

(51) Int. Cl.
*H01L 31/0203* (2006.01)

(52) U.S. Cl. .......... 257/434; 257/98; 257/432; 257/437; 438/72; 438/110; 438/460; 428/41.7; 428/41.8

(58) Field of Classification Search .......... 257/431–434; 359/621, 819; 348/340, 373
See application file for complete search history.

(56) References Cited

U.S. PATENT DOCUMENTS

| | | | |
|---|---|---|---|
| 6,428,641 B1 * | 8/2002 | Yoon et al. | 156/64 |
| 6,444,403 B1 * | 9/2002 | Shimoto et al. | 430/313 |
| 6,537,854 B1 | 3/2003 | Chang et al. | |
| 6,919,230 B2 * | 7/2005 | Chiu | 438/118 |
| 7,135,352 B2 * | 11/2006 | Yokajty et al. | 438/68 |
| 7,964,926 B2 * | 6/2011 | Kim | 257/431 |
| 2003/0007084 A1 * | 1/2003 | Nakjoh | 348/340 |
| 2005/0254133 A1 | 11/2005 | Akram et al. | |
| 2006/0006486 A1 * | 1/2006 | Seo et al. | 257/433 |
| 2007/0116964 A1 * | 5/2007 | Guo et al. | 428/414 |
| 2007/0217019 A1 | 9/2007 | Huang et al. | |
| 2008/0027302 A1 * | 1/2008 | Buse et al. | 600/347 |
| 2008/0280037 A1 * | 11/2008 | Sheridan et al. | 427/208.8 |
| 2009/0206431 A1 * | 8/2009 | Bolken et al. | 257/432 |
| 2011/0248367 A1 * | 10/2011 | Yang et al. | 257/432 |

FOREIGN PATENT DOCUMENTS

| | | |
|---|---|---|
| EP | 1674910 A1 | 6/2006 |
| EP | 1811772 A2 | 7/2007 |
| JP | 9111204 A | 4/1997 |
| JP | 2004200965 A | 7/2004 |
| JP | 2006005025 A | 1/2006 |

OTHER PUBLICATIONS

European Search Report (EP 10 15 2636), mailed Apr. 19, 2010.

* cited by examiner

*Primary Examiner* — Steven Loke
*Assistant Examiner* — Victoria Hall
(74) *Attorney, Agent, or Firm* — Stout, Uxa, Buyan & Mullins, LLP

(57) ABSTRACT

A fabricating method includes adhering an exposed surface of a first solid adhesive film to a first substrate. The second surface of the first solid adhesive film is exposed and adhered to a second substrate. A third substrate is adhered to a second substrate via a patterned second solid adhesive film, and a diaphragm layer is adhered to the third substrate via a patterned third solid adhesive film. A fourth solid adhesive film with a removable release film is adhered to the first substrate covered, followed by slicing to form wafer level lens modules.

8 Claims, 6 Drawing Sheets

FABRICATING METHOD AND STRUCTURE OF A WAFER LEVEL MODULE

CROSS-REFERENCE TO OTHER APPLICATIONS

The present application claims the benefit of U.S. Provisional Application Ser. No. 61/239,184 filed on Sep. 2, 2009, the complete subject matter of which is hereby incorporated herein by reference in its entirety.

BACKGROUND OF THE INVENTION

1. Field of the Invention

The present invention generally relates to a wafer level module, and more particularly to a structure and fabricating method of a wafer level module with a solid adhesive film.

2. Description of Related Art

Wafer level optics is a technique of fabricating miniaturized optics such as lens modules or camera modules at the wafer level using semiconductor techniques. The wafer level optics technique is well adapted to mobile or handheld devices. In fabricating conventional wafer level optics, liquid adhesive is usually applied, for example, by screen printing or coating, between two substrates that are to be bonded. Owing to the characteristics of the liquid adhesive, the thickness of the resultant adhesive layer could not be maintained constant. Further, with reference to FIG. 1A and FIG. 1B, the liquid adhesive 10 may result in overflow between two substrates 12 and 14. In the worst case, the shift of the liquid adhesive may cause misalignment between the substrates, thereby malfunctioning the resultant module. Accordingly, the patterns of the module are commonly designed with larger margins, and thus fewer modules may be fabricated on a wafer. Moreover, a substantive portion of time is consumed in coating or printing the liquid adhesive, particularly to a module with complex patterns.

Due to the uneven thickness of the liquid adhesive as mentioned above, a wafer level lens module or camera module normally requires using additional adjustment means, such as a screw, in order to mechanically arrive at a required focus. For the foregoing reason that conventional wafer level modules cannot be effectively designed and fabricated, a need has arisen to propose a novel scheme for resolving the aforementioned drawbacks.

SUMMARY OF THE INVENTION

In view of the foregoing, it is an object of the embodiments of the present invention to provide a structure and fabricating method of a wafer level module that is capable of effectively maintaining thickness evenness of the adhesive layer, and facilitating ease of alignment and application of the adhesive layer.

According to a first embodiment, a first solid adhesive film with a first release film and a second release film that respectively cover a first surface and a second surface of the first solid adhesive film is provided. Openings are then patterned through the first solid adhesive film. After removing the first release film(s) to expose the first surface of the first solid adhesive film, the exposed first surface of the first solid adhesive film is aligned and adhered to a first substrate. After removing the second release film to expose the second surface of the first solid adhesive film, the exposed second surface of the first solid adhesive film is aligned and adhered to a second substrate, thereby resulting in a wafer level module.

According to a second embodiment, the first substrate comprises a first spacer layer, the second substrate comprises a lens substrate, a third substrate is further aligned and adhered to the second substrate via a patterned second solid adhesive film, and a diaphragm layer is aligned and adhered to the third substrate via a patterned third solid adhesive film.

According to a third embodiment, a fourth solid adhesive film is aligned and adhered to the first substrate with one removable release film covering the fourth solid adhesive film. Slicing is performed to generate a number of wafer level lens modules with the removable release film.

According to a fourth embodiment, the release film is removed to expose the fourth solid adhesive film, and the exposed fourth solid adhesive film is aligned and adhered to an image sensor.

DETAILED DESCRIPTION OF THE INVENTION

FIG. 2A to FIG. 2F illustrate a structure and fabricating method of a wafer level module according to a first embodiment of the present invention. In the embodiment, a (transparent) solid adhesive film (or solid glue film) 21 is firstly provided as shown in the respective top and cross-sectional views of FIG. 2A and FIG. 2B. The solid adhesive film 21 is normally accompanied with a first release (or protective) film 22A and a second release film 22B that respectively cover a top surface and a bottom surface of the solid adhesive film 21. The first/second release films 22A/B are used to shield the solid adhesive film 21 before application of the solid adhesive film 21. The solid adhesive film 21, in the embodiment, is primarily made of thermosetting material such as, but not limited to, epoxy, which is pre-cured into solid form as an adhesive.

Figure 1A:
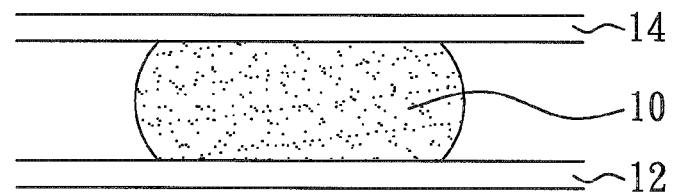
FIG. 1A shows a conventional liquid adhesive applied between two substrates.
Figure 1B:
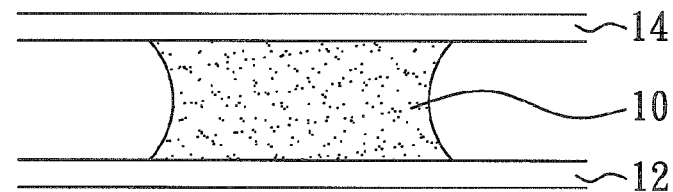
FIG. 1B shows an overflow condition resulting from an inability to maintain a constant thickness of the conventional liquid adhesive between the two substrates.
Figure 2A:
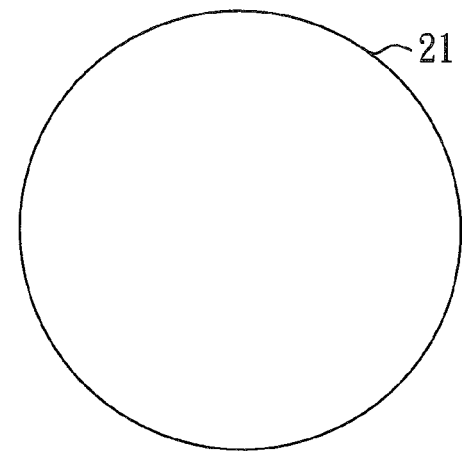
FIG. 2A to FIG. 2F illustrate a structure and fabricating method of a wafer level module according to a first embodiment of the present invention.
Figure 2B:
Figure 2C:
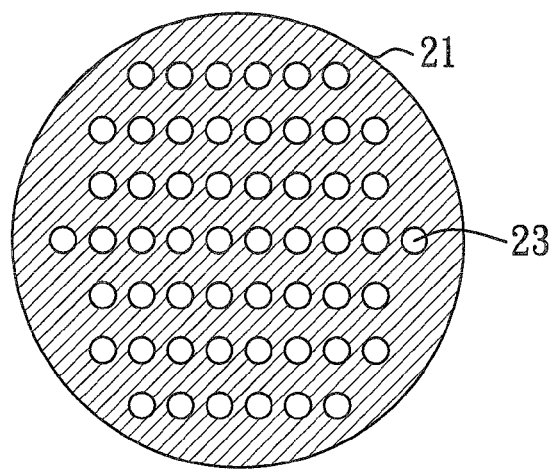

The solid adhesive film 21 covered with the first/second release films 22A/B is then subjected to patterning to obtain a plurality of openings (or holes) 23 passing through the solid adhesive film 21 and the first/second release films 22A/B as shown in FIG. 2C. The openings 23 may be designed to any shape (e.g., circle, rectangle, polygon or other shape) and size. The openings 23 may be patterned by physical means (such as hole punching or laser cutting) or chemical means (such as exposure and then etching).

Figure 2D:
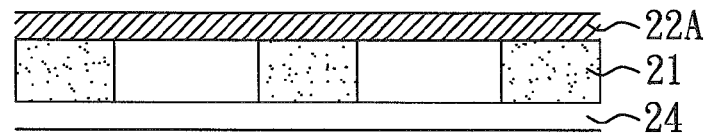

Subsequently, one of the release films (e.g., the second release film 22B) is peeled or stripped off to expose one surface (e.g., the bottom surface) of the solid adhesive film 21. The exposed surface of the solid adhesive film 21 is then aligned and adhered (or bonded) to a first substrate 24 as shown in FIG. 2D. The first substrate 24 may, for example, be a semiconductor wafer, a glass substrate, lens substrate or any substrate suitable for wafer level fabrication. The resultant product shown in FIG. 2D may be shipped or sold as a half-finished (or intermediate) product that may be further processed (by others) to result in a finished product.

Figure 2E:
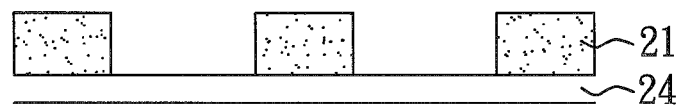
Figure 2F:
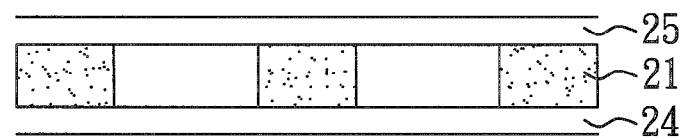

Afterwards, the other release film (e.g., the first release film 22A) is also peeled or stripped off to expose the other surface (e.g., the top surface) of the solid adhesive film 21, resulting in a structure shown in FIG. 2E. The exposed surface of the solid adhesive film 21 is then aligned and adhered (or bonded) to a second substrate 25 as shown in FIG. 2F. In order to strengthen the bond between the first substrate 24 and the second substrate 25, heat and/or pressure is commonly applied. The amount of the heat and the pressure varies according to the specific application. For example, the structure of FIG. 2F, in some applications, may be subjected to a pressure of 1-10 newton per square millimeter (N/mm$^2$) and a temperature of about 150-180 degrees Celsius (° C.). In an alternative embodiment, the structure of FIG. 2F may be cured by ultra violet (UV) instead of heat. The second substrate 25 may, for example, be a semiconductor wafer, a glass substrate, lens substrate or any substrate suitable for wafer level fabrication. It is noted that the first substrate 24 and the second substrate 25 may not necessarily contain the same material. For example, with respect to a photovoltaic cell (e.g., solar cell) or a light-emitting diode (LED), the first substrate 24 may be a semiconductor (e.g., sapphire) substrate and the second substrate 25 may be a glass substrate with lens. After subjecting the structure shown in FIG. 2F to slicing, a plurality of wafer level solar or LED modules or devices may therefore be obtained. The method illustrated in FIG. 2A through FIG. 2F may be well adapted to the manufacture of a module with conventional scale.

According to the embodiment described above, the thickness of the resultant adhesive layer (i.e., the solid adhesive film 21) between the first substrate 24 and the second substrate 25 may be substantially maintained constant compared to the conventional counterpart that uses liquid adhesive. Further, as the solid adhesive film 21 in the embodiment may not overflow or shift even under pressure, the dimension of the pattern in the adhesive layer (i.e., the solid adhesive film 21) may be precisely controlled with less margin, and, therefore, more (or denser) patterns may be fabricated on a wafer, thereby increasing yield and cost efficiency. Moreover, as the adhesive layer (i.e., the solid adhesive film 21) in the embodiment is pre-patterned rather than coated (e.g., screen printed) as in the conventional process, substantive time may thus be saved and patterns with more complex shapes may be attainable.

Figure 3A:
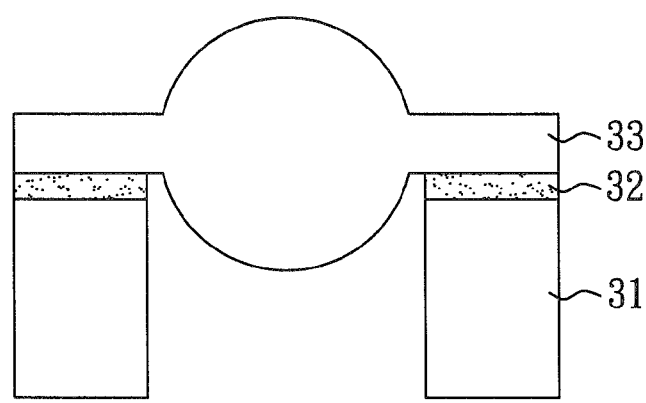
FIG. 3A to FIG. 3C illustrate a structure and fabricating method of a wafer level lens module according to a second embodiment of the present invention.
Figure 3B:
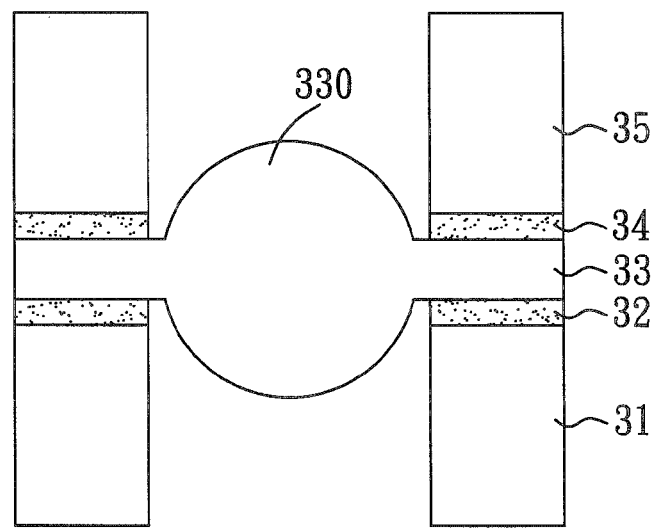
Figure 3C:
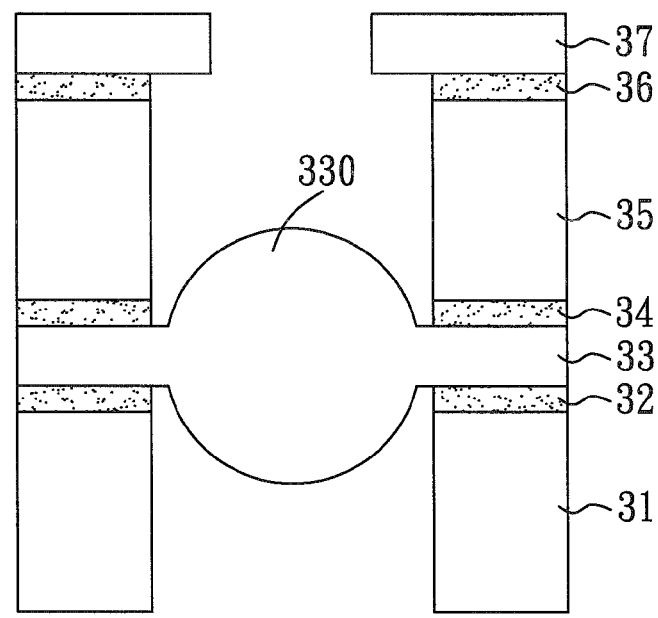

FIG. 3A to FIG. 3C illustrate a structure and fabricating method of a wafer level lens module according to a second embodiment of the present invention. It is appreciated by those skilled in the art that the order of performing the fabrication may be different from or even opposite to that shown in FIGS. 3A-3C. Referring to FIG. 3A, a first substrate 31 is firstly adhered (or bonded) to a second substrate 33 via a (patterned) first solid adhesive film 32. For brevity, only one module has been illustrated in the figure. Specifically, in the embodiment, the first substrate 31 is a first (patterned) spacer layer and the second substrate 33 is a lens substrate. The bonding between the first spacer layer 31 and the lens substrate 33, and the patterning of the first solid adhesive film 32 have been described in the first embodiment and are thus omitted here for brevity.

Subsequently, as shown in FIG. 3B, the second substrate (e.g., the lens substrate) 33 is adhered to a third substrate (e.g., a second spacer layer) 35 via a (patterned) second solid adhesive film 34. It is observed in the figure that the first and second solid adhesive films 32 and 34 have patterns (such as circular openings) with dimensions that approximate that of the lens 330 of the lens substrate 33.

Afterwards, referring to FIG. 3C, a diaphragm layer 37 is adhered to the third substrate (i.e., the second spacer layer) 35 via a (patterned) third solid adhesive film 36. In the embodiment, the diaphragm layer 37 is used as an iris of a camera, and is made of a solid adhesive film that is dyed beforehand for blocking light. After subjecting the entire wafer to slicing, the individual wafer level lens module as shown in FIG. 3C may therefore be obtained.

According to the present embodiment as described above, the first/second/third solid adhesive films 32/34/36 provide the same advantages of the first embodiment. Furthermore, the thickness of the first/second/third solid adhesive films 32/34/36 in the present embodiment may be properly pre-selected such that the focus of the resultant lens module may be precisely pre-determined without resorting to adjustment using a screw as in the conventional art.

Figure 4A:
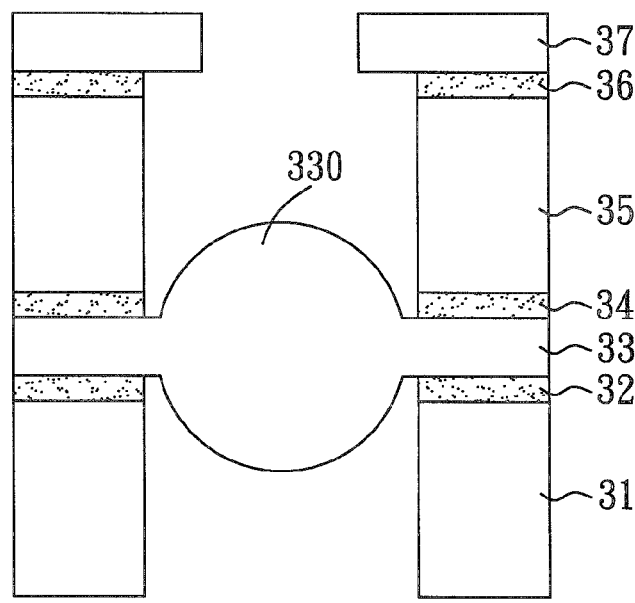
FIG. 4A and FIG. 4B illustrate a structure and fabricating method of a wafer level lens module according to a third embodiment of the present invention.
Figure 4B:
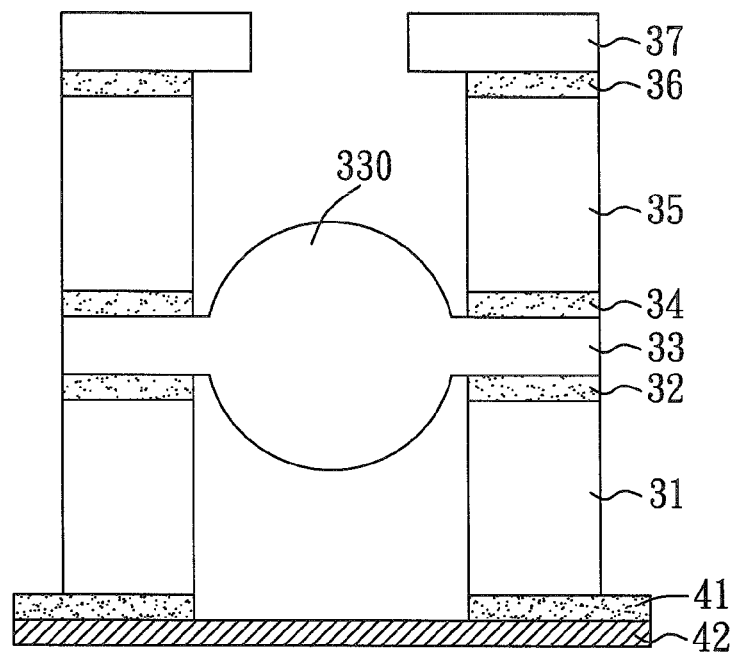

FIG. 4A and FIG. 4B illustrate a structure and fabricating method of a wafer level lens module according to a third embodiment of the present invention. Firstly, as shown in FIG. 4A, a wafer level lens module such as that of FIG. 3C before slicing is provided. The same numerals as those in the previous embodiment are therefore used in the present embodiment. For brevity, only one module has been illustrated in the figure. Subsequently, referring to FIG. 4B, a fourth solid adhesive film 41 is aligned and adhered to the bottom surface of the first substrate (i.e., the first spacer layer) 31. It is observed in the figure that one release film 42 remains covering the bottom surface of the fourth solid adhesive film 41. After subjecting the entire wafer to slicing, the individual wafer level lens module as shown in FIG. 4B may therefore be obtained. The resultant product shown in FIG. 4B may be shipped or sold as a half-finished (or intermediate) product that may be further processed (by others) to result in a finished product. For example, a person receiving this half-finished product (FIG. 4B) may peel off the release film 42 to expose the bottom surface of the fourth solid adhesive film 41, followed by adhering the exposed surface, for example, to an image sensor (not shown), thereby resulting in a wafer level camera module.

Figure 5A:
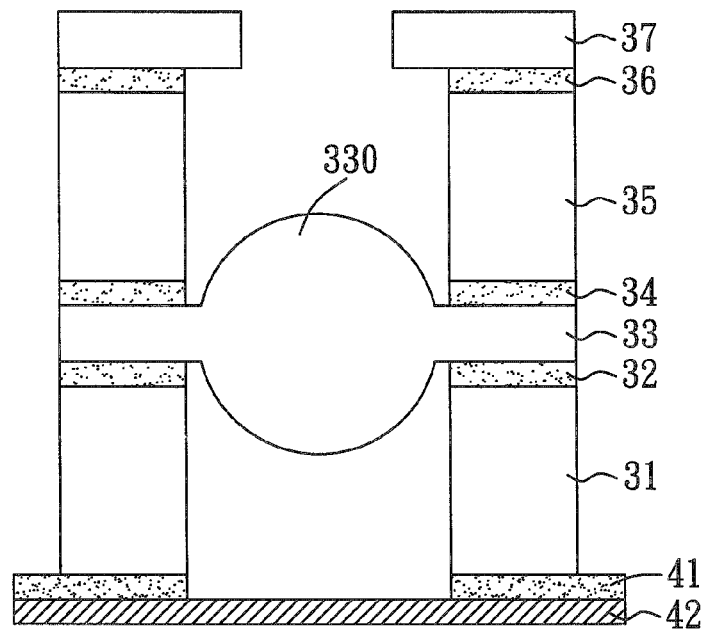
FIG. 5A and FIG. 5B illustrate a structure and fabricating method of a (wafer level) compact camera module (CCM) according to a fourth embodiment of the present invention.
Figure 5B:
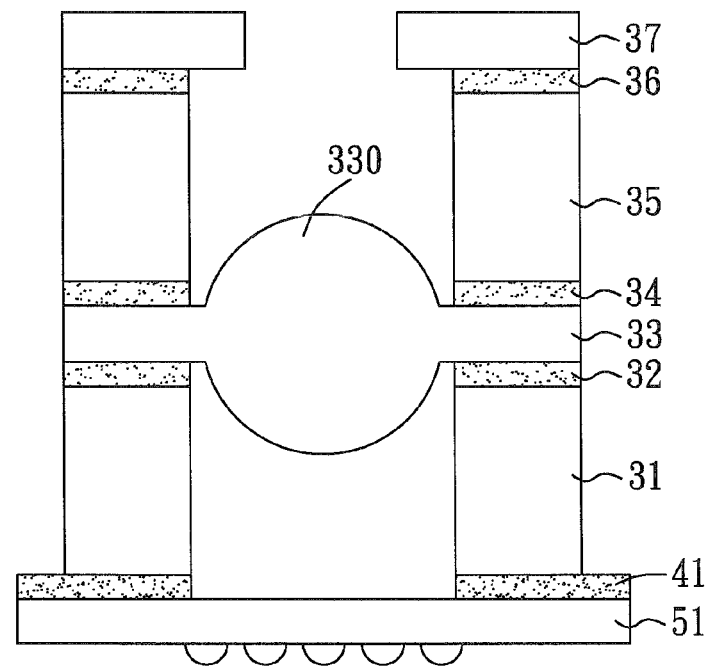

FIG. 5A and FIG. 5B illustrate a structure and fabricating method of a (wafer level) compact camera module (CCM) according to a fourth embodiment of the present invention. Firstly, as shown in FIG. 5A, a wafer level lens module such as that of FIG. 4B is provided. The module may be either non-sliced or sliced. Like numerals as those in the previous embodiment are thus used to designate like parts in the present embodiment. Subsequently, referring to FIG. 5B, the release film 42 covering the fourth solid adhesive film 41 is peeled off, followed by aligning and adhering the lens module to an image sensor 51 such as a complementary metal oxide semiconductor (CMOS) image sensor or a charge coupled device (CCD). After subjecting the entire wafer to slicing, to the extent the lens module has not been sliced before, individual (wafer level) compact camera module(s) as shown in FIG. 5B may therefore be obtained.

According to the present embodiment as described, the same advantages as in the previous embodiments are provided. Furthermore, the fourth solid adhesive film 41 may not overflow or shift even under pressure, and the image sensor 51 therefore will not be abnormally blocked by overflowing liquid glue as occurred in the conventional art.

Although specific embodiments have been illustrated and described, it will be appreciated by those skilled in the art that various modifications may be made without departing from the scope of the present invention, which is intended to be limited solely by the appended claims.

What is claimed is:

1. A method of fabricating a wafer level module, comprising:
    providing a first solid adhesive film with a first release film and a second release film that respectively cover a first surface and a second surface of the first solid adhesive film;
    patterning a plurality of openings through the first solid adhesive film;
    removing the first release film to expose the first surface of the first solid adhesive film; aligning and adhering the exposed first surface of the first solid adhesive film to a first substrate;
    removing the second release film to expose the second surface of the first solid adhesive film;
    aligning and adhering the exposed second surface of the first solid adhesive film to a second substrate;
    aligning and adhering a third substrate to the second substrate via a patterned second solid adhesive film;
    aligning and adhering a diaphragm layer to the third substrate via a patterned third solid adhesive film;
    aligning and adhering a fourth solid adhesive film to the first substrate with one removable release film covering the fourth solid adhesive film; and
    performing slicing to form a plurality of wafer level lens modules with the removable release film;
    wherein the first substrate comprises a first spacer layer and the second substrate comprises a lens substrate.

2. The method of claim 1, wherein the first solid adhesive film comprises thermosetting material.

3. The method of claim 2, wherein the first solid adhesive film comprises epoxy.

4. The method of claim 1, wherein the openings are patterned by punching or laser cutting.

5. The method of claim 1, wherein the openings are patterned by etching.

6. The method of claim 1, wherein the first substrate and the second substrate are subjected to heat, pressure, ultra violet or their combination.

7. The method of claim 1, wherein the diaphragm layer comprises a solid adhesive film that is dyed.

8. The method of claim 1, further comprising:
    removing the one removable release film covering the fourth solid adhesive film; and
    aligning and adhering the fourth solid adhesive film to an image sensor.

* * * * *